United States Patent [19]

Fruit et al.

[11] Patent Number: 4,827,555
[45] Date of Patent: May 9, 1989

[54] DRIVE CHAIN CLEANING APPARATUS

[76] Inventors: Richard E. Fruit, 6360 Cairo Liles Rd.; Lee B. Willingham, 17846 Hwy. 1078 South, both of Henderson, Ky. 42420

[21] Appl. No.: 200,537

[22] Filed: May 31, 1988

[51] Int. Cl.⁴ .............................................. A46B 9/02
[52] U.S. Cl. ................................... 15/160; 15/256.6; D4/130; 474/92
[58] Field of Search ................ 15/256.6, 160; 474/92; D4/130; 280/158 R, 158.1

[56] References Cited

U.S. PATENT DOCUMENTS

| D. 278,390 | 4/1985 | Bailey | D4/130 X |
|---|---|---|---|
| 606,184 | 6/1898 | Burnip | 15/160 |
| 616,593 | 12/1898 | Stanbury, Jr. | 15/160 |
| 635,778 | 10/1899 | Hudelson | 15/256.6 X |
| 636,408 | 11/1899 | Hurvitz | 15/160 |
| 2,974,338 | 3/1961 | Roth et al. | 15/256.6 X |

*Primary Examiner*—Peter Feldman
*Attorney, Agent, or Firm*—Warren D. Flackbert

[57] ABSTRACT

A drive chain cleaning implement characterized by a base having an end portion and projecting portions each carrying bristles which present an overlying and straddling relationship with the drive chain, as on a motorcycle. The base includes an elongated handle portion and, typically, is made from wood, where the aforesaid bristles are made from stainless steel. The invention serves for ready cleaning of a drive chain to eliminate unwanted residues, such as sand, dirt and the like, prior to lubrication and/or oiling.

1 Claim, 1 Drawing Sheet

DRIVE CHAIN CLEANING APPARATUS

As is known, the usage of motorcycles, such as those commonly identified as dirt bikes, is widespread, where a particular difficulty with such usage is in connection with the accumulation of unwanted debris, such as sand, dirt, weeds, grass clippings or the like on the drive chain. A need has arisen, therefore, for a means for eliminating the aforesaid residues prior to oiling, where the invention readily satisfies the problem.

More specifically, a cleaning implement is presented herein which is particularly suitable for cleaning the drive chain of a motorcycle, where such is accomplished by a straddling relationship between the implement and the chain. In a use condition, the wheel operated by the drive chain is hand rotated with the implement at an operative position, thus, achieving the required cleaning prior to lubrication. The implement is simple in form, being defined, typically, by a wooden body or base mounting sections of stainless steel bristles.

In any event, a better understanding of the present invention will become more apparent from the following description, taken in conjunction with the accompanying drawing, wherein

Figure 1:
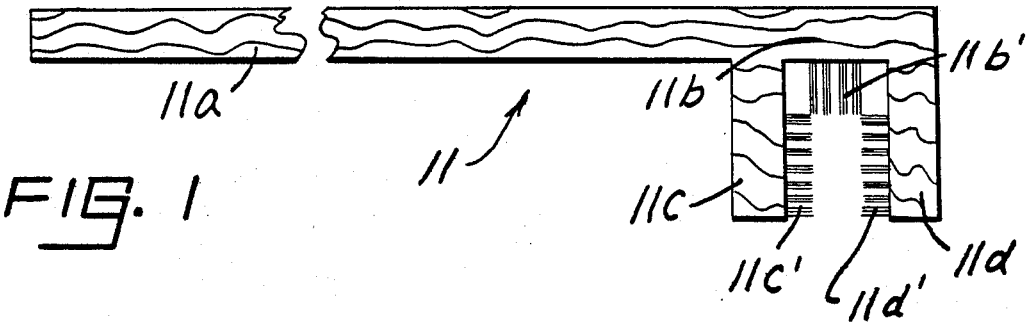
FIG. 1 is a view in side elevation showing a drive chain cleaning implement in accordance with the teachings of the present invention.

For the purposes of promoting an understanding of the principles of the invention, reference will now be made to the embodiment illustrated in the drawing and specific language will be used to described the same. It will nevertheless be understood that no limitations of the scope of the invention is thereby intended, such alterations and further modifications in the illustrated device, and such further applications of the principles of the invention as illustrated therein being contemplated as would normally occur to one skilled in the art to which the invention relates.

Figure 2:
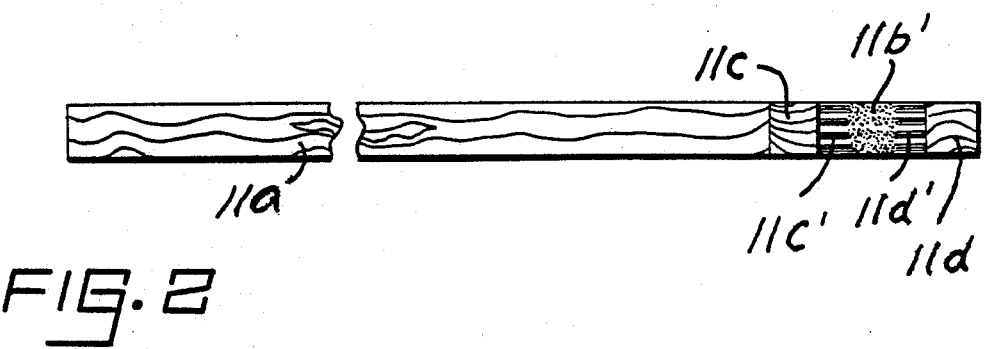
FIG. 2 is a bottom plan view of the instant drive chain cleaning implement, i.e. looking upwardly on FIG. 1; and, FIG. 3 is a perspective view of the drive chain cleaning implement in a typical use condition.

Referring now to the figures, and particularly FIGS. 1 and 2, the drive chain cleaning implement of the invention is defined by an elongated straight base 11, presenting a portion 11a which serves handle purposes, an axially extending end portion 11b coplanar with the base, and two outwardly extending portions 11c and 11d which extend at right angles to the base 11, where portions 11b, 11c and 11d are in the general shape of a U (see FIG. 1). The aforesaid three portions have flat inner surfaces which carry bristles 11b', 11c' and 11d' at right angles to the flat inner surfaces thereon. The open side of the working end of the implement permits ready access to an implement use condition, as will be explained herebelow.

As shown in FIGS. 1 and 2, it should be noted that the tips of the all of the bristles 11b', 11c', and 11d', on each of the inner surfaces are coplanar to assure effective bristle contact with the surfaces of the drive chain.

Typically, the implement is made of wooden stock, where the brisltes are stainless steel. In an alternative form, the implement could be fabricated from a rigid high impact plastic resin, for example.

Figure 3:
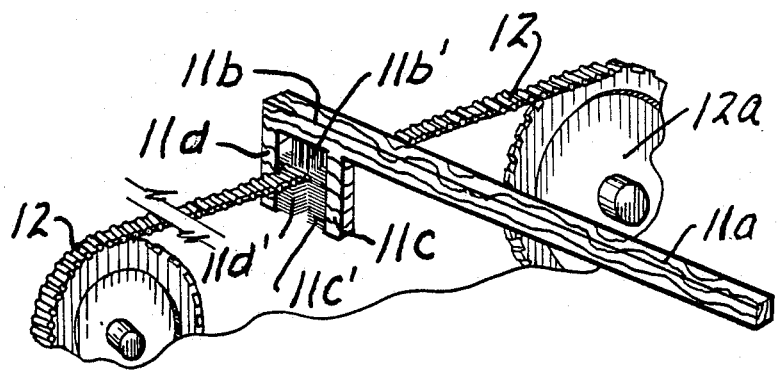

In a use condition, and as evident in FIG. 3, the implement is placed in a straddling relationship over a link drive chain 12 typically utilized in the driving of a motorcycle (not shown). Since such drive chain 12 usually accumulates dust, dirt and other debris, cleaning is necessary prior to oiling and/or lubrication.

In this connection, the user usually hand rotates a sprocket wheel 12a, causing the entire length of the chain 12 to successively be engaged with the bristles 11b', 11c' and 11d', achieving cleaning action. As required, the implement can be reversed, or even angled, to directly contact all chains 12 surfaces. Thereafter, the drive chain 12 is ready for oiling and/or lubrication.

It should be evident, therefore, that the drive chain cleaning implement presented herein is readily carried; easily placed in position for straddling a chain for the cleaning of unwanted debris; and, effective in drive chain cleaning, i.e. all surfaces of the latter. The instant implement is light in weight and, as well, readily fabricated and/or assembled.

The drive chain cleaning implement described hereabove is susceptible to various changes within the spirit of the invention, including, by way of example, in proportioning; the selection of particular bristle material; the material utilized for the base; and, the like. Thus, the preceding should be considered illustrative and not as limiting the scope of the following claims:

We claim:

1. A drive chain cleaning implement comprising an elongated straight base presenting a handle portion, an axially extending end portion thereof being coplanar with said straight base portion, and two outwardly extending portions at said end portion extending at right angles to said straight base handle portion, said two outwardly extending portions and said end portion defining a U shape in plan configuration, the inner surfaces of said two outwardly extending portions and the inner surface of said end portion all being flat and positioned at right angles to each other, and bristles extending from the flat inner surfaces of said two outwardly extending portions and the flat inner surface of said end portion and serving an operative straddled engaging relationship with the drive chain at a use condition, where said bristles on said inner surfaces of said two outwardly extending portions are at right angles to said bristles on said inner surface of said end portion, the tips of all of said bristles on each of said inner surfaces being coplanar, and where said bristles are made from stainless steel.

* * * * *